Figure 7:
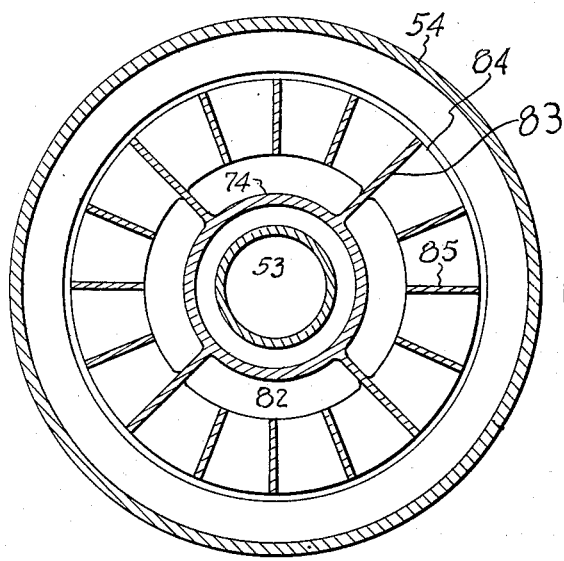

June 4, 1946.　　　　M. L. EDWARDS　　　　2,401,469
FOAM REDUCER
Filed Aug. 28, 1943　　　　3 Sheets-Sheet 1
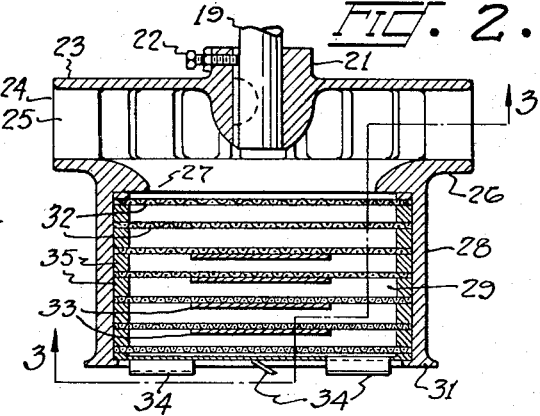
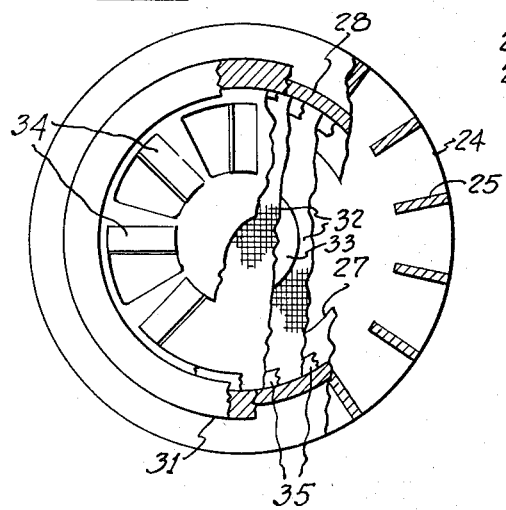
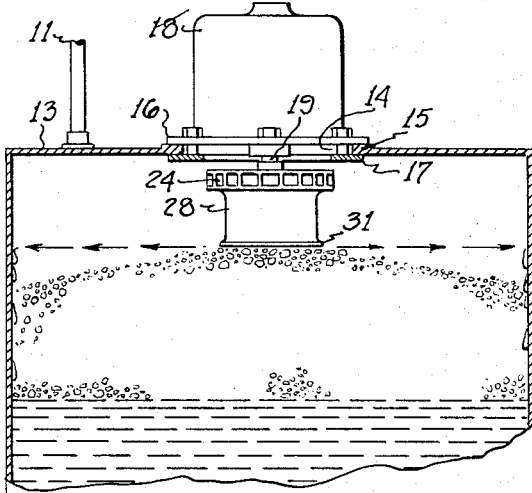
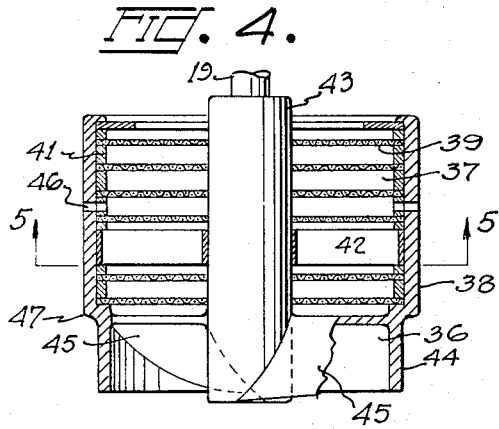
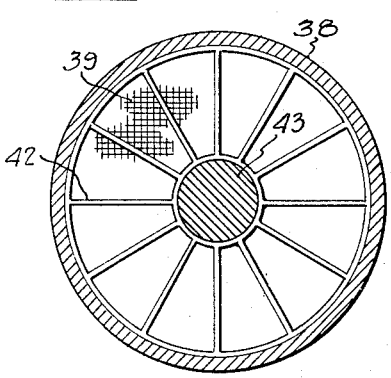
INVENTOR
MILES LOWELL EDWARDS
BY
ATTORNEY

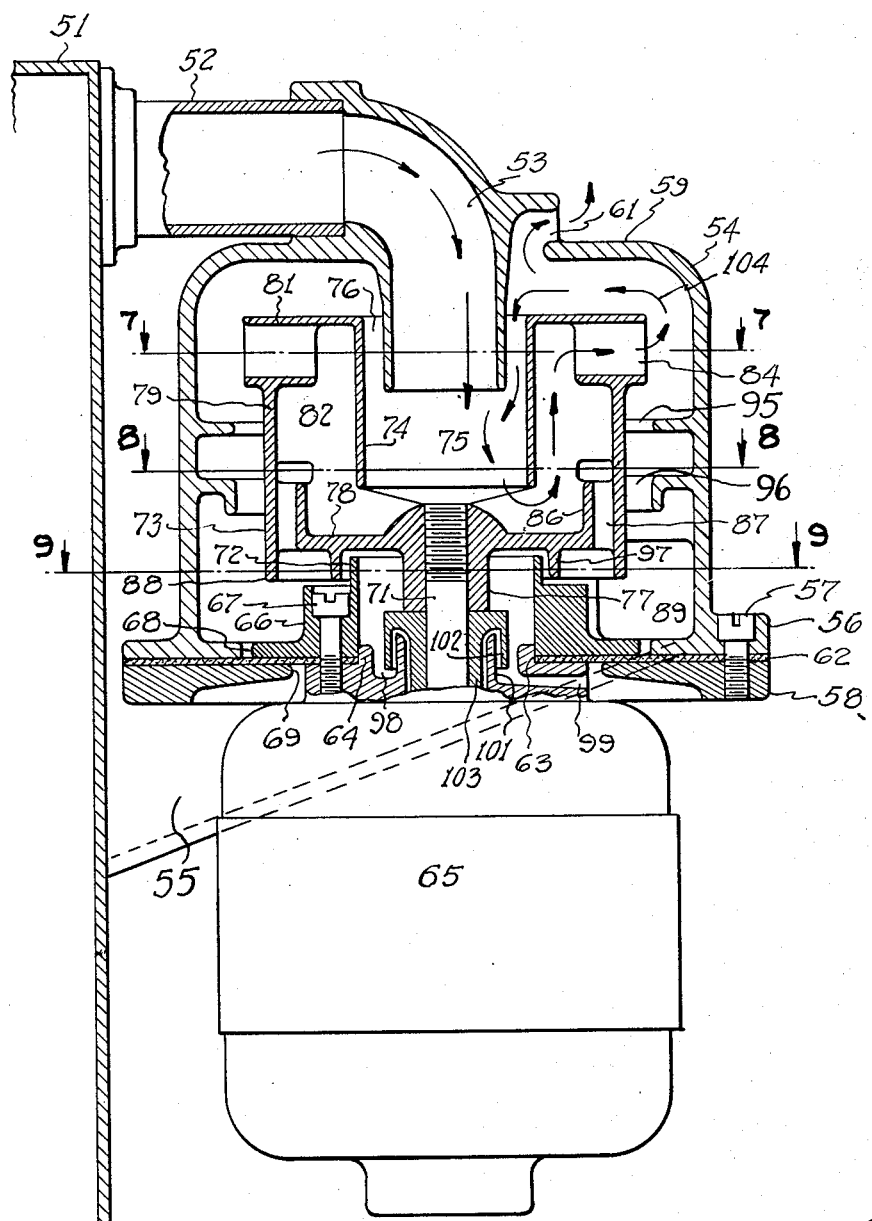

June 4, 1946.  M. L. EDWARDS  2,401,469
FOAM REDUCER
Filed Aug. 28, 1943   3 Sheets-Sheet 3

INVENTOR
MILES LOWELL EDWARDS
BY Harold D. Cook
ATTORNEY

Patented June 4, 1946

2,401,469

UNITED STATES PATENT OFFICE 2,401,469

FOAM REDUCER

Miles Lowell Edwards, Longview, Wash.

Application August 28, 1943, Serial No. 500,453

13 Claims. (Cl. 252—361)

This invention relates to a method of separating foam into its constituent parts, liquid and gaseous fluid, and to an apparatus for practicing the method.

The invention is herein described as being particularly applicable for use in connection with the oil storage tanks of high altitude aircraft. The equipment commonly in use for handling lubricating oil may cause it to entrain considerable quantities of air, both in solution and in the form of an infinite number of tiny bubbles. Ordinarily air entrained in the oil does not appear to be in any quantity which affects the fluidity of the oil or which interferes with pumping or other handling operations. The reason probably is to be found in the fact that the viscosity of the oil is such as to render the presence of a considerable quantity of air a negligible factor. However, when the pressure of the atmosphere is considerably lessened, such as occurs during an aeroplane flight to high altitudes, the air bubbles increase enormously in size, and dissolved air is released in the oil.

It is known that in aircraft intended to fly at high altitudes oil storage tanks are provided of considerably larger capacity than is required for the quantity of oil to be carried, in order to provide room for expansion or foaming of the oil as the aircraft gains altitude. Notwithstanding this provision for expansion, considerable quantities of oil may be lost whenever the foam completely fills the available storage space and is forced out of the vent pipes. Such loss of oil may impair engine lubrication, and offers the hazard of fire. Moreover, large quantities of air present in the foam which fills the oil tanks may interfere with proper functioning of the oil handling apparatus.

Foam consists of two fluids, the one being a liquid having a quality enabling it to form and maintain a thin filament, and the other being a gaseous fluid (usually air) which inflates and supports the filaments in the form of bubbles. The weight of a foam bubble in terms of the liquid of which it is formed is very small, while volumetrically the gaseous fluid usually predominates. The strength of the thin liquid filament determines its ability to stretch to a larger size as expansion of the gaseous fluid occurs, as well as its ability to support itself against gravitational force acting upon the film which tends to flatten the bubble and to break it. Thus the film strength of the filament determines the quality of a foam to resist expansion of the gaseous fluid and to maintain itself against destruction by gravity.

With these considerations in mind, it is a primary object of the invention to provide a method of crushing foam to break the liquid filament and release the gaseous fluid.

It is a further object of the invention to provide a method of handling foam for producing centrifugal separation of the constituent parts of the foam.

It is a further object of the invention to provide an apparatus wherein centrifugal force acting upon the foam structure crushes the liquid filament and expels the liquid relatively free of entrained gaseous fluid.

It is a further object of the invention to provide an apparatus wherein centrifugal force acting upon the foam crushes the bubble structure of the foam, separates the liquid from the gaseous fluid, and expels each constituent part in a state relatively free of the other.

It is a further object of the invention to provide an apparatus into which foam may be conducted and in which centrifugal force is used for destroying the foam structure and separating its ingredients, and from which the gaseous fluid is allowed to escape and the liquid is recovered for use.

These and other desired objects and advantages of the invention are obtained through the novel arrangement, the unique construction and the improved combination of the various parts hereinafter described in conjunction with the accompanying drawings, it being understood that various changes in form, proportion, size and details of construction within the scope of the claims may be resorted to without departing from the spirit or sacrificing any of the advantages of the invention.

Figure 8:
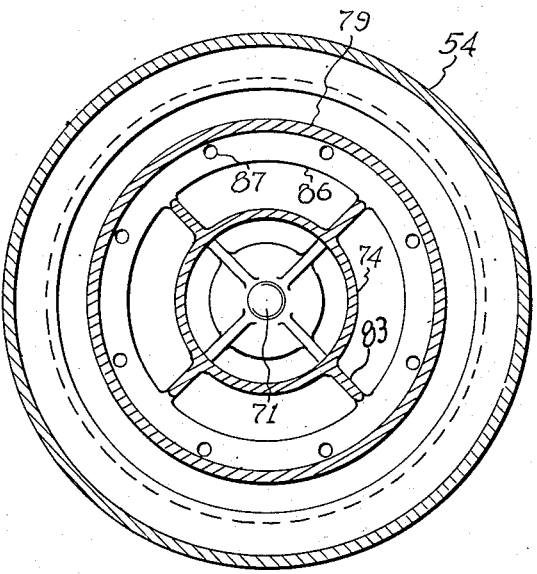
Figure 9:
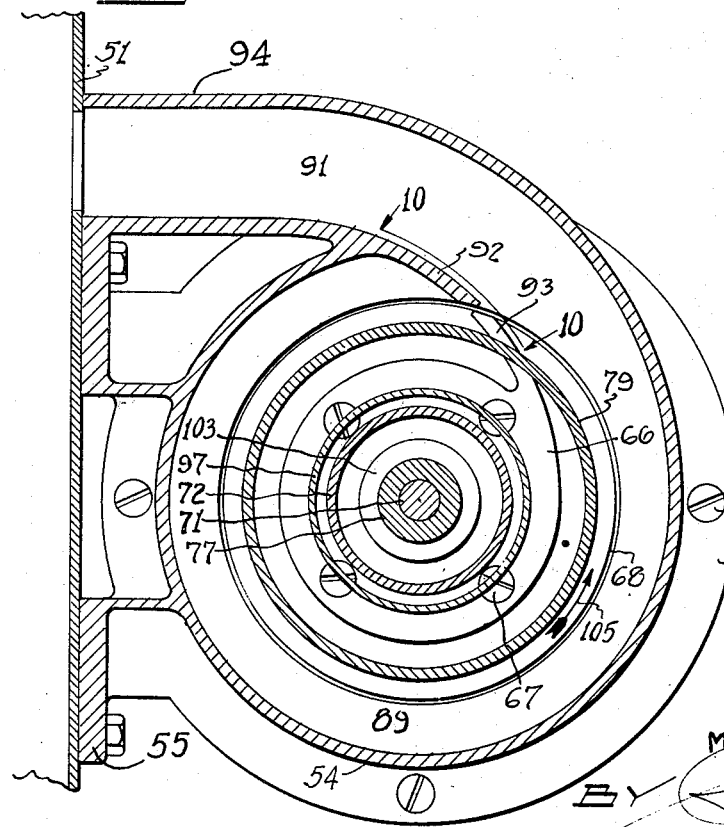
Figure 10:
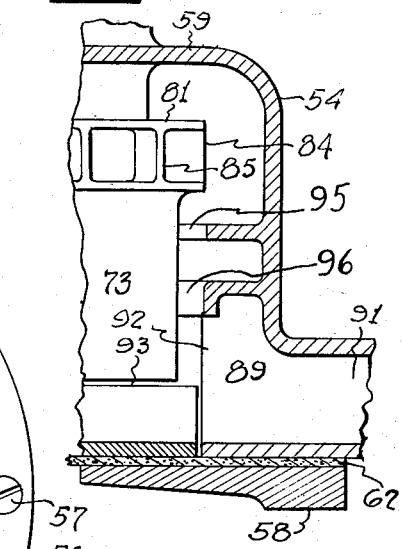

In the drawings: Figure 1 is a sectional elevation of a tank wherein foam is likely to form, showing a foam reducer embodying the present invention mounted therewithin; Figure 2 is a sectional elevation of the foam reducer shown in Figure 1; Figure 3 is a cross section taken on the line 3—3 of Figure 2 showing the centrifugal fan blades, the construction of the separating chamber, and the form of vanes in the separating chamber; Figure 4 is a sectional elevation of a foam reducer of modified construction; Figure 5 is a cross section taken on the line 5—5 of Figure 4 and looking in the direction of the arrows; Figure 6 is a sectional elevation of a foam reducer such as may be mounted exteriorly of the tank wherein quantities of foam are likely to be created; Figure 7 is a cross section taken on the line 7—7 of Figure 6, showing the construction of the centrifugal fan which forms a portion of the centrifuge; Figure 8 is a cross section taken on the line 8—8 of Figure 6 and showing the construction of the separating chamber; Figure 9 is a cross section taken on the line 9—9 of Figure 6 and illustrating the means of utilizing the velocity of the centrifuge and of the recovered liquid for returning the liquid to a place of use; and Figure 10 is a fragmentary detail illustrating the construction of the outlet, taken on the line 10—10 of Figure 9.

Referring to Figures 1, 2 and 3 of the drawings, there is illustrated a storage tank 10 for liquids susceptible of foaming, which, in this instance, may be the oil storage tank of a high altitude aircraft. The tank is equipped with a vent pipe 11 and oil supply lines 12 through which oil may be withdrawn from the tank to an airplane engine.

The tank comprises a cover 13 having an opening 14 therethrough defined by a flange 15. The opening 14 is closed by a plate 16 secured to the flange 15 at spaced intervals therearound by means of screws threadedly engaging tapped wells in the mounting ring 17 mounted on the flange 15. Mounted on the plate 16 is a motor 18, the armature shaft 19 extending through the plate 16 and normally depending into the tank 10.

Mounted in the upper portion of the tank 10 is a foam reducer comprising a hub 21 designed to be fitted over the end of the armature shaft and secured thereto as by a screw 22. Secured to the hub and extending radially therefrom is a circular plate 23 which forms the upper shroud plate of a centrifugal fan 24 comprising radially disposed blades 25. The lower shroud plate 26 of the centrifugal fan is interrupted at its center to define the inlet orifice 27 for the fan. Formed integrally with the lower shroud plate 26 and depending therefrom in concentric relation with the inlet orifice 27 is a cylindrical wall 28 containing therewithin the separating chamber 29. The lower edge 31 of the cylindrical wall 28 defines the inlet for the separating chamber. The several parts are integrally connected and arranged for coincidental rotation.

Mounted in the separating chamber is a series of horizontally disposed wire mesh screens 32, these screens being positioned one above the other in vertical axial alignment. The screens are separated axially of the chamber by means of rings 35 positioned between adjacent screens for holding them in spaced apart relation. At the center of screens 32 a disc 33 interrupts passage therethrough and forces material entering the chamber into the peripheral area of the chamber and so into the area of greatest rotational velocity. As shown in Figure 2, only the lowermost screens may be equipped with the discs 33 so as to avoid restricting the inlet 27 for the centrifugal fan. A plurality of vanes 34 are mounted in the separating chamber and extend radially from the edge of the discs 33 into engagement with the cylindrical wall 28. These vanes may preferably extend from a point within the inlet to the separating chamber to a point adjacent the inlet orifice 27 of the centrifugal fan. The lower ends of the vanes 34 may be curved forwardly in the direction of rotation and function as scoops for introducing foam into the separating chamber.

In operation, assuming that conditions prevail which cause an excessive amount of foam to form in the tank 10, the motor 18 is energized to drive the armature shaft 19 and so rotate the foam reducer hereinabove described. Rotation of the centrifugal fan 24 exhausts air from the separating chamber and operates to draw foam from the upper portion of the tank into the separating chamber 29. The presence of the discs 33 forces the foam into the area of maximum rotational velocity. In the separating chamber the vanes 34 induce coincidental rotation of the foam and the chamber, whereby centrifugal force tends to crush the foam bubbles and separate the two ingredients of the foam. In fact, two forces act upon the foam to break the foam bubbles. One is centrifugal force by which the liquid component of the foam is made sufficiently heavy to crush the foam bubbles. The other is the axial flow through the screens as created by the centrifugal fan. The overlying meshes of the several screens 32 tend to break the bubbles as the foam is flattened thereagainst by the suction created by the centrifugal fan, whereupon the air released from the foam is discharged by the centrifugal fan into the upper portion of the tank 10, and the liquid residue of the foam is returned to the tank in a manner presently to be described. The liquid residue of the foam is thrown outwardly by centrifugal action and forms a ring of liquid on the inner surface of the cylindrical wall 28. This liquid flows downwardly along the wall 28, passes out through the foam intake opening, and is thrown tangentially from the lower edge 31 of the wall into the tank 10. Under usual operating conditions the liquid impinges on the walls of the tank 10 and flows downwardly therealong into the pool of liquid in the bottom of the tank. The air which is liberated from the foam bubbles is withdrawn from the separating chamber 29 by the centrifugal fan and discharged into the upper end of the tank 10 to displace the foam entering the bottom of the separating chamber.

Figures 4 and 5 illustrate an axial flow pump 36 and separating chamber 37 mounted in axial alignment. The separating chamber 37 is contained within a cylindrical housing 38. Mounted within the separating chamber 37 are a plurality of horizontal screens 39 mounted one above the other in vertical alignment and supported in spaced apart relation by means of rings 41. The inlet to the separating chamber at the lower end of the cylindrical housing 38 is coincident with the discharge from the axial flow pump 36. Also mounted within the separating chamber, preferably adjacent the lower end thereof, are a plurality of radially extending vanes 42. The structure is supported on a hub 43 secured to the armature shaft 19 by a suitable fastening means (not shown). The hub 43 is in the form of a cylinder which extends axially of the separating chamber and axial flow pump and to which are attached the inner ends of the radial vanes 42 and screens 39.

The axial flow pump 36 comprises a cylindrical shroud 44 and spirally shaped blades 45 extending between the shroud 44 and the hub 43. It will be noted that the diameter of the cylindrical shroud 44 is somewhat less than the diameter of the cylindrical housing 38, the reason for which will presently be explained.

The operation of the device disclosed in Figures 4 and 5 may be described as follows: The motor 18 being energized to drive the armature shaft 19, rotation is imparted to the foam reducer to create by action of the axial flow pump a flow of foam upwardly through the pump and into the separating chamber 37. The hub 43 is of sufficient diameter relative to the cylindrical housing 38 that foam entering the device is caused to flow into the area of greatest rotational velocity. As the foam bubbles are acted upon by the axial flow pump they are forced upwardly through the wire meshes of the screens 39, against which the bubbles are crushed, and the two ingredients of the foam subjected to the separating action of the centrifugal force created by rotation of the device. It is believed that only a portion of the foam is dissipated by the lowermost screens 39, so that an appreciable amount of the foam enters that portion of the separating chamber occupied by the vanes 42. These vanes induce coincidental rotation of the foam bubbles and the separating chamber and thus subject the foam to the action of centrifugal force which, due to the differential in weight between the liquid and the gaseous ingredients of the foam, is productive of a complete centrifugal separation of the gaseous fluids from the liquid component of foam delivered to the separating chamber by the axial flow pump. From thence the gaseous fluid is discharged out of the upper end of the separating chamber 37, while the liquid residue of the foam is thrown outwardly by centrifugal force and collects on the inner surface of the cylindrical housing 38 from whence it escapes through ports 46 drilled through the wall of the housing. In the event the liquid tends to flow down the outer surface of the cylindrical housing 38, it is thrown off the lower edge 47 in a direction generally tangential to the housing and may impinge on the walls of the tank 10. The lesser diameter of the cylindrical shroud 44 inhibits the flow of liquid from the outer surface of the cylindrical housing 38 onto the outer surface of the cylindrical shroud 44 from whence it might otherwise flow to a point within the influence of the stream of foam entering the axial flow pump and so be recirculated through the device.

Referring to Figure 6 and related views of the drawings, a foam reducer is illustrated as being mounted adjacent an oil storage tank 51 having a vent pipe 52. In the instant structure, instead of venting the storage tank 51 to atmosphere, the vent pipe 52 leads to the intake 53 of a foam reducer embodying the instant invention. The foam reducer comprises a housing 54 having a bracket 55 cast integrally therewith for mounting the device on the storage tank or any other suitable supporting frame member as may be convenient or desirable.

The housing 54 is of generally cylindrical shape and is provided with a flange 56 having tapped recesses for the reception of screws 57 which engage in similarly tapped recesses of a mounting ring 58. The upper end of the housing is closed by an end wall 59 through which extends the intake 53. The end wall 59 is interrupted adjacent the wall of the intake 53 to form an opening 61 providing communication between the interior of the housing 54 and the atmosphere. It is important to note that by this structure the storage tank 51 is vented to atmosphere by way of vent pipe 52, housing 54 and opening 61. At the opposite end of the housing 54 a gasket 62 secured between the flange 56 and the mounting ring 58 is provided with a central orifice 63 through which extends an axial extension 64 of the motor housing 65. A flanged collar 66 is secured to the motor housing 65 by means of machine screws 67. The gasket 62 is disposed between the flanged collar 66 and the motor housing 65 and extends also between the flange 56 on the housing and the mounting ring 58, and forms resilient means for securing the motor to the housing 54. For lending rigidity to the gasket 62, the peripheral edge 68 of the collar 66 overlies the inner edge 69 of the mounting ring 58, the gasket 62 extending therebetween. The armature shaft 71 of the motor extends upwardly into the housing 54 in axial alignment with the intake 53 and concentrically of the housing 54. The collar 66 forms an axially extending cylindrical member 72 surrounding the armature shaft 71 for preventing liquid from entering the motor from the interior of the housing 54.

Mounted within the housing 54 in concentric relation thereto and supported on a hub 77 threadedly engaging the armature shaft 71 is a centrifuge 73. Centrally of the centrifuge 73 is a cylinder 74 forming a chamber 75 into which depends the open end of the intake 53. The cylinder 74 is of sufficiently greater diameter than the intake 53 that a passage 76 is provided between the wall of the intake 53 and the wall of the cylinder 74, the purpose of which will presently be explained.

Mounted upon the hub 77 is the bottom plate 78 which carries the cylindrical wall 79 of the centrifuge. A top plate 81 forms a closure member for the upper end of the centrifuge exteriorly of the cylinder 74. Between the cylinder 74 and the wall 79 is an annular separating chamber 82, this chamber being divided by a series of radially extending vanes 83. Each of these vanes extends radially from the wall of the cylinder 74 to the cylindrical wall 79 of the centrifuge, and extends axially from the bottom plate 78 to the top plate 81, except as interrupted by other structure presently to be described.

A centrifugal fan 84 comprising radially disposed blades 85 is mounted in the upper portion of the centrifuge 73, the entrance to the fan being from the separating chamber 82, the fan exhausting into the upper part of the housing 54.

The cylindrical wall 79 of the centrifuge 73 is provided with a boss 86 through which are provided openings 87 providing communication between the separating chamber 82 and the area within the lower portion of the housing 54.

The cylindrical wall 79 depends somewhat below the bottom plate 78 of the centrifuge, and liquid flowing from the separating chamber 82 through the openings 87 is thrown tangentially from the lower edge 88 of the cylindrical wall 79 into the volute area 89. The volute area 89 may be described as being that area within the housing 54 between the cylindrical member 72 of the collar 66 and the cylindrical wall of the housing. The volute area 89 terminates in a discharge outlet 91, the inner end of which is formed in part by transverse wall portions 92 and 93 which separate the discharge outlet from the remainder of the volute area. A pipe line 94 leads from the discharge outlet 91 to a pipe connection in the wall of the storage tank 51. A check valve (not shown) is disposed in the pipe line between the discharge and the tank. Projecting inwardly from the cylindrical wall of the housing 54 to a point adjacent the cylindrical wall 79 of the centrifuge are baffle rings 95 and 96 for confining the splash from liquid entering the volute area 89.

A circular wall 97 depending from the bottom plate 78 of the centrifuge is interfitted in telescopic relation with the cylindrical member 72 on the collar 66 and forms a barrier against the passage of liquid from the volute area into the area within the cylindrical member 72. A well 98 is provided in the motor housing 65 into which liquid may flow from the area within the cylindrical flange 72, a drain outlet 99 being provided to conduct liquid therefrom to the exterior of the motor housing. The inner wall 101 of the well 98 is interfitted with a wall 102 depending into the well from a collar 103 secured to the shaft 71 to prevent liquid entering the well from following down the armature shaft 71.

In operation, assuming that liquid stored in the tank 51 is caused to foam to the extent that foam is expelled from the tank through the vent pipe 52, the foam enters the foam reducer through the intake 53 from whence it drops into the chamber 75. From the chamber 75 the foam flows downwardly and outwardly into the separating chamber 82 in which it is subjected to the action of centrifugal force acting through the vanes 83. The vanes 83 induce rotation of the foam at the same rate of speed as the centrifuge. Centrifugal force acting upon the foam bubbles causes them to flatten and break against the cylindrical wall 79. Due to the centripetal or inward flow tendency of gaseous fluids in a whirling mixture with liquid, the gaseous ingredient of the bubbles, when liberated by destruction of the foam, tends to move upward into the area of influence of a centrifugal fan 84 and is discharged by the fan into the upper portion of the housing 54. In Figure 6 the arrows 104 indicate that the air discharged into the upper portion of the housing 54 by the fan 84 may recirculate through the passage 76 into the chamber 75 and from thence through the separating chamber 82 and through the fan. As air enters the centrifuge through the intake 53 in the form of an ingredient of the foam bubbles and is liberated therefrom by the action of centrifugal force in the separating chamber 82, a like amount of air will be discharged through the vent opening 61. It is important to note that by reason of the circulation of air through the device the fan 84 does not create a suction on the vent pipe 52 such as would tend to evacuate the storage tank 51. The device is so constructed, however, that the air stream moving downwardly through the passage 76 tends to assist the movement of foam from the chamber 75 into the separating chamber 82.

The liquid ingredient of the foam forms a liquid ring on the inner surface of the cylindrical wall 79 of the centrifuge from whence it flows through the openings 87 into the volute area 89. Due to the high rate of peripheral speed of the cylindrical wall 79, liquid flowing from the separating chamber 82 is thrown tangentially from the lower edge 88 of the wall 79 into the volute area with sufficient force to impart to the liquid in the volute a velocity sufficient to create a positive flow from the volute area through the pipe line 94 to the storage tank 51. In Figure 9 the arrow 105 indicates the direction of rotation of the centrifuge.

At times, when large quantities of heavy foam enter the centrifuge, a correspondingly large quantity of liquid is thrown from the lower edge 88 of the wall 79. There may be times when this flow of liquid is greater than will normally be expelled from the volute area by means hereinbefore described. When this flow into the volute area is greater than the outflow, any excess liquid remaining in the volute area will accumulate and cause the liquid level to rise to a point where direct contact will be made between the liquid surface and the rapidly traveling edge 88. Skin friction between this rapidly traveling member and the liquid will cause a centrifugal pumping action within the volute to further force flow of liquid out through pipe line 94 and into storage tank 51. In a modification of the structure shown in Figure 6, a more distinct form of centrifugal pump is provided employing vanes which create a positive centrifugal pumping action within the volute.

While the invention has been described herein with particular reference to its use in aircraft, its field of usefulness is not so limited. It is not intended, therefore, that the description shall be considered in a limiting sense, or that the use of particular language or phraseology pertaining to the application mentioned shall in any wise restrict the scope or limit the uses for which the invention may be employed.

Having now described my invention and in what manner the same may be used, what I claim as new and desire to protect by Letters Patent is:

1. A device for reducing foam comprising a wall defining a chamber, means for rotating said chamber, fan blades rotatable with said chamber for inducing a flow of foam into said chamber, means mounted in said chamber and rotatable therewith for inducing coincidental rotation of said foam and said chamber whereby the liquid component of said foam is made sufficiently heavy by centrifugal force to crush the foam bubbles, means defining an outlet from said chamber for the gaseous component of said foam, and means defining an outlet from said chamber for the liquid residue of said foam.

2. A device for reducing foam comprising a wall defining a chamber, means for rotating said chamber, axial flow fan blades rotatable with said chamber for inducing a flow of foam into said chamber, a plurality of radially directioned vanes mounted in said chamber and rotatable therewith for inducing coincidental rotation of said foam and said chamber for producing centrifugal separation of the constituent parts of said foam, means defining an outlet from said chamber for the gaseous components of said foam, and means defining an outlet from said chamber for the liquid residue of said foam.

3. A device for reducing foam comprising a wall defining a chamber, means for rotating said chamber, centrifugal fan blades rotatable with said chamber for inducing a flow of foam into said chamber, transverse baffle means mounted in said chamber and extending outwardly from the axial center thereof for directing said foam into the area of maximum rotational velocity in said chamber, means mounted in said chamber and rotatable therewith for inducing a coincidental rotation of said foam and said chamber for producing centrifugal separation of the constituent parts of said foam, means defining an outlet from said chamber for the gaseous component of said foam, and means defining an outlet from said chamber for the liquid residue of said foam.

4. A device for reducing foam comprising a wall defining a chamber, means for rotating said chamber, fan blades rotatable with said chamber for inducing a flow of foam into said chamber, means mounted in said chamber and rotatable therewith for forcing coincidental rotation of said foam and said chamber whereby the liquid component of said foam is made sufficiently heavy by centrifugal force to crush the foam bubbles, means defining an outlet adjacent one end of said chamber for the gaseous component of said foam, and means defining an outlet adjacent the wall of said chamber for the liquid residue of said foam.

5. A device for reducing foam comprising a tank for storing liquid, a centrifuge, means for conducting foam from said tank to said centrifuge, means in said centrifuge for producing centrifugal separation of the constituent parts of said foam, a centrifugal fan mounted in said centrifuge for discharging therefrom the gaseous residue of said foam, and means for returning the liquid residue of said foam to said tank.

6. A device for reducing foam comprising a tank for storing liquid, a centrifuge, means defining an inlet for admitting foam into said centrifuge, means in said centrifuge for producing centrifugal separation of the constituent parts of said foam, a centrifugal fan mounted in said centrifuge for discharging therefrom the gaseous residue of said foam, and centrifugal pump means for returning the liquid residue of said foam to said tank.

7. A device for reducing foam comprising a housing, a centrifuge mounted in said housing, means defining an inlet for admitting foam into said centrifuge, means in said centrifuge for producing centrifugal separation of the constituent parts of said foam, fan blades rotatable with the centrifuge for inducing an axial flow of gaseous fluids through said housing, and centrifugal means for expelling the liquid component of the foam from said housing.

8. A device for reducing foam comprising a housing, a centrifuge mounted in said housing, means defining an inlet for admitting foam into said centrifuge, means in said centrifuge for producing centrifugal separation of the constituent parts of said foam, means defining a volute chamber in said housing, means for conducting liquid from said centrifuge into said volute chamber, and centrifugal pumping means for expelling liquid from said volute chamber.

9. A device for reducing foam and for separating the constituent parts of said foam, comprising a casing, means for rotating said casing, means forming a cylindrical chamber in said casing, a centrifugal fan in said casing for inducing a flow of foam into said chamber, means mounted in said chamber for applying centrifugal force to said foam, means for preventing the flow of liquid from said chamber into said fan, and means defining an outlet from said chamber for the liquid residue of said foam.

10. A device for reducing foam and for separating the constituent parts of said foam, comprising a casing, a centrifugal fan mounted in said casing, means defining an inlet for said fan, a chamber in said casing having communication with said inlet, means defining an inlet for admitting foam into said chamber, means mounted in said chamber for applying centrifugal force to foam entering said casing, and means for rotating said casing.

11. A device for reducing foam and for separating the constituent parts of said foam, comprising a casing, means forming a chamber in said casing, a centrifugal fan in said casing for inducing a flow of foam into said chamber, means for rotating said casing, and means mounted in said chamber for applying centrifugal force to said foam.

12. A foam breaking apparatus which comprises means defining an open ended rotatable chamber, means for rotating said chamber, radial vanes in said chamber for centrifugally whirling the foam therein to effect centrifugal separation of the constituent parts of the foam, centrifugal pumping means for discharging separated liquid from the chamber, an annular liquids receiving chamber for said pumping means, a liquids outlet for said receiving chamber, and a gaseous material outlet separate from said liquids outlet.

13. A foam reducing apparatus comprising a rotor defining a separating chamber with an axial foam inlet, a peripheral liquids outlet and a separate gaseous material outlet, means for rotating said chamber, means in said chamber for inducing rotation of foam with the chamber to effect centrifugal separation of constituent parts of the foam, centrifugal pumping means to discharge the separated liquid through said peripheral liquids outlet, an annular liquids chamber for receiving the liquid from the peripheral outlet, and a discharge outlet for said annular liquids chamber.

MILES LOWELL EDWARDS.